(12) United States Patent
Mansour et al.

(10) Patent No.: US 10,680,744 B2
(45) Date of Patent: Jun. 9, 2020

(54) COMMUNICATION DEVICE AND METHOD

(71) Applicant: Lantiq Deutschland GmbH, Neubiberg (DE)

(72) Inventors: Avi Mansour, Raanana (IL); Ziv Avital, Raanana (IL)

(*) Notice: Subject to any disclaimer, the term of this patent is extended or adjusted under 35 U.S.C. 154(b) by 1 day.

(21) Appl. No.: 15/566,011

(22) PCT Filed: May 12, 2016

(86) PCT No.: PCT/EP2016/060774
§ 371 (c)(1),
(2) Date: Oct. 12, 2017

(87) PCT Pub. No.: WO2016/180946
PCT Pub. Date: Nov. 17, 2016

(65) Prior Publication Data
US 2018/0131465 A1    May 10, 2018

Related U.S. Application Data

(60) Provisional application No. 62/160,653, filed on May 13, 2015.

(51) Int. Cl.
*H04L 1/00* (2006.01)
*H04L 1/16* (2006.01)
*H04W 28/04* (2009.01)
*H04W 28/06* (2009.01)
*H04L 1/20* (2006.01)

(52) U.S. Cl.
CPC .......... *H04L 1/0034* (2013.01); *H04L 1/1614* (2013.01); *H04W 28/04* (2013.01); *H04W 28/065* (2013.01); *H04L 1/0003* (2013.01); *H04L 1/0007* (2013.01); *H04L 1/0061* (2013.01); *H04L 1/203* (2013.01)

(58) Field of Classification Search
None
See application file for complete search history.

(56) References Cited

U.S. PATENT DOCUMENTS

| | | | | |
|---|---|---|---|---|
| 8,792,379 B1* | 7/2014 | Vivanco | ........... | H04L 43/0876 370/232 |
| 8,819,512 B1* | 8/2014 | Wang | ........... | H04L 1/08 714/748 |
| 2004/0250124 A1* | 12/2004 | Chesla | ........... | G06F 21/552 726/13 |
| 2006/0187964 A1* | 8/2006 | Li | ........... | H04W 74/002 370/474 |
| 2008/0043732 A1* | 2/2008 | Desai | ........... | H04L 49/109 370/389 |
| 2008/0177884 A1* | 7/2008 | Agarwal | ........... | H04L 1/1841 709/227 |
| 2009/0316725 A1* | 12/2009 | Frederiks | ........... | H04J 3/1629 370/470 |

(Continued)

OTHER PUBLICATIONS

International Search Report dated Aug. 4, 2016 for International Application PCT/EP2016/060774.

*Primary Examiner* — Edan Orgad
*Assistant Examiner* — Emmanuel K Maglo
(74) *Attorney, Agent, or Firm* — 2SPL Patent Attorneys

(57) ABSTRACT

Multiple of first packets of at least partially different lengths are aggregated into a sequence of subframes of a second packet. The second packet is transmitted via a radio channel.

15 Claims, 5 Drawing Sheets

(56) References Cited

U.S. PATENT DOCUMENTS

| | | | |
|---|---|---|---|
| 2013/0156005 A1* | 6/2013 | Li | H04L 5/001 |
| | | | 370/331 |
| 2014/0149350 A1* | 5/2014 | Chen | G06F 16/27 |
| | | | 707/634 |
| 2014/0254408 A1* | 9/2014 | Shukla | H04L 1/0002 |
| | | | 370/252 |
| 2016/0142232 A1* | 5/2016 | Gao | H04L 27/0008 |
| | | | 370/329 |
| 2018/0262420 A1* | 9/2018 | Jaffer | H04L 45/24 |

* cited by examiner

COMMUNICATION DEVICE AND METHOD

REFERENCE TO RELATED APPLICATIONS

This application is a National Phase entry application of International Patent Application No. PCT/EP2016/060774 filed May 12, 2016, which claims priority to U.S. Provisional Application 62/160,653 filed on May 13, 2015, entitled "Communication Device and Method" in the name of Avi Mansour et al. and is hereby incorporated by reference in its entirety.

TECHNICAL FIELD

Various embodiments relate to a device comprising an interface configured to transmit on a radio channel and at least one processor configured to aggregate a plurality of first packets of at least partially different lengths into a sequence of subframes of a second packet. Further embodiments relate to a corresponding method.

BACKGROUND

When communicating on a radio channel, channel sensing and/or link adaptation can facilitate transmission reliability. As part of the channel sensing, transmission characteristics of the communication on the radio channel are determined. Example transmission characteristics can include a bit error rate (BER), a packet error rate (PER), etc. Link adaptation enables to control transmission properties used for transmitting on the radio channel. The transmission properties can thereby be tailored in view of current transmission characteristics. E.g., in a scenario where the communication reliability on the radio channel is degraded and comparably high BER is experienced, transmission properties such as the symbol modulation, transmission power, subframe length, etc. can be dimensioned conservatively to avoid excessive packet loss.

E.g., in the framework of the Institute of Electrical and Electronics Engineers (IEEE) 802.11x Wi-Fi protocol, probing packets are used to facilitate the estimation of the BER as part of channel sensing. However, it has been noticed that based on conventional techniques of employing probing packets, the BER can only be determined with limited accuracy.

SUMMARY

Therefore, a need exists for advanced techniques of facilitating channel sensing and/or link adaptation. In particular, need exists for techniques which overcome or mitigate at least some of the above-mentioned drawbacks and restrictions.

This need is met by the features of the independent claims. The features of the dependent claims define embodiments.

According to an example, a device comprises an interface and at least one processor. The interface is configured to transceive on a radio channel. The at least one processor is configured to aggregate a plurality of first packets of at least partially different lengths into a second packet. The at least one processor is further configured to transmit the second packet via the interface. The at least one processor is further configured to receive at least one acknowledgement message is indicative of successful or failed receipt of the plurality of first packets. The at least one processor is configured to perform at least one of channel sensing and link adaptation of the radio channel based on the at least one acknowledgement message.

According to an example, a method comprises aggregating a plurality of first packets into a second packet. The plurality of first packets have at least partially different lengths. The method further comprises transmitting the second packet on a radio channel. The method further comprises receiving at least one acknowledgement message on the radio channel. The at least one acknowledgement message is indicative of successful or failed receipt of the plurality of first packets. The method further comprises performing at least one of channel sensing and link adaptation of the radio channel based on the at least one acknowledgement message.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
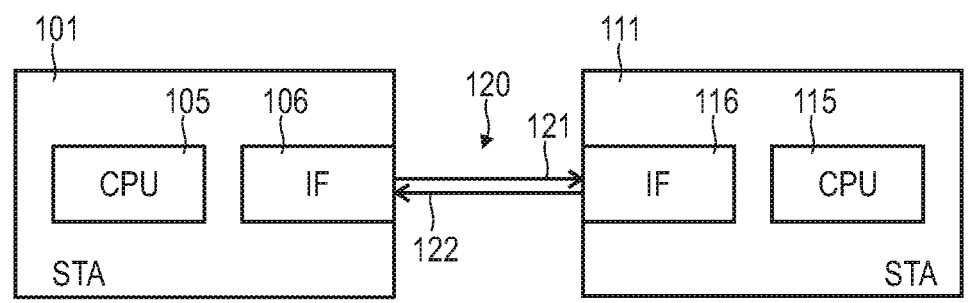
FIG. 1 schematically illustrates a first communication device and a second communication device configured to communicate on a radio channel.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of aggregating a plurality of first packets into a second packet are described. The aggregation techniques, in some examples, rely on subframes. Each subframe of the second packet may include a corresponding first packet. The subframes may include a subframe delimiter. The subframe delimiter may facilitate deaggregation.

In some examples, the second packet corresponds to a probing packet. The probing packet can be distinguishably characterized against protocol packets. Thus, techniques of communicating protocol packets and probing packets on a radio channel are described. The protocol packets and the probing packets may be defined with respect to the same position of a transmission protocol stack of the radio channel. At least the protocol packets may carry higher-layer user data, sometimes referred to as payload data. The payload data can be included in payload sections of one or more data packets; a given protocol packet may carry one or more data packets. The probing packets, on the other hand side, may facilitate accurate channel sensing and/or link adaptation. For this, in some examples, the probing packets may also carry payload data; or may carry dedicated probing control data. Alternatively or additionally, a transmission property of the probing packets may deviate from a respective set transmission property of the adjacent protocol packets. The transmission property may be one or more of the following: a transmission power; a symbol modulation; a symbol coding; etc. The probing packets may be interleaved into a sequence of protocol packets. The probing packets may be repeatedly communicated according to a probing timing, e.g., at a certain periodicity.

In some examples, a length distribution of the data packets aggregated into a given probing packet is implemented. I.e., it is possible that data packets of different length are aggregated into the probing packet. Techniques described herein are based on the finding that a more accurate channel sensing and/or link adaptation—which may include, in some examples, determining a BER—can be performed if the channel sensing and/or link adaptation is based on data packets having different lengths. This is because the length of a data packet influences the likelihood of encountering a bit error. Generally, for longer (shorter) packets, the likelihood of encountering a bit error in one of the bits of the respective packet is larger (smaller) for a given baseline channel condition. Thus, by performing channel sensing and/or link adaptation based on a plurality of data packets having a length distribution, channel sensing and/or link adaptation can be performed at a plurality of working points corresponding to the different packet lengths.

To accurately detect successful receipt or failed receipt, an acknowledgement message may be considered. The acknowledgment message may indicate the receipt status of the aggregated data packets.

Hereinafter, various examples are described in the context of the IEEE 802.11x Wi-Fi protocol. However, respective techniques may also be readily employed for other types of radio access technologies, including, but not limited to: Bluetooth communication; satellite communication; cellular networks such as Third Generation Partnership Project (3 GPP)-specified radio access technologies including 2G, 3G, 4G, and upcoming 5G.

The techniques described herein may find particular application in the Internet of Things (IoT) realm. Here, accurate link adaptation enables high data throughput and low energy consumption.

FIG. 1 illustrates a communication device 101 and a communication device 111 (both labeled station, STA in FIG. 1) which communicate via a radio channel 120. The radio channel 120 is bidirectional, i.e., implements an upstream (US) channel 121 and a downstream (DS) channel 122. The device 101 comprises a processor 105 and an interface 106. The interface 106 is configured to transceive on the radio channel 120-122, i.e. to transmit and/or receive data. Likewise, the device 102 comprises a processor 115 and an interface 116. The interface 116 is configured to transceive on the radio channel 120-122.

The processors 105, 115 are configured to perform various techniques associated with elements selected from the group comprising: data packet aggregation; medium access control; data packet deaggregation; transmitting data via the respective interface 106, 116; receiving data via the respective interface 106, 116; participating in an Automatic Repeat Request (ARQ) protocol; participating in an Hybrid ARQ (HARQ) protocol including forward error correction (FEC) based on checksums associated with protocol packets, data packets, and/or probing packets; etc.

Figure 2:
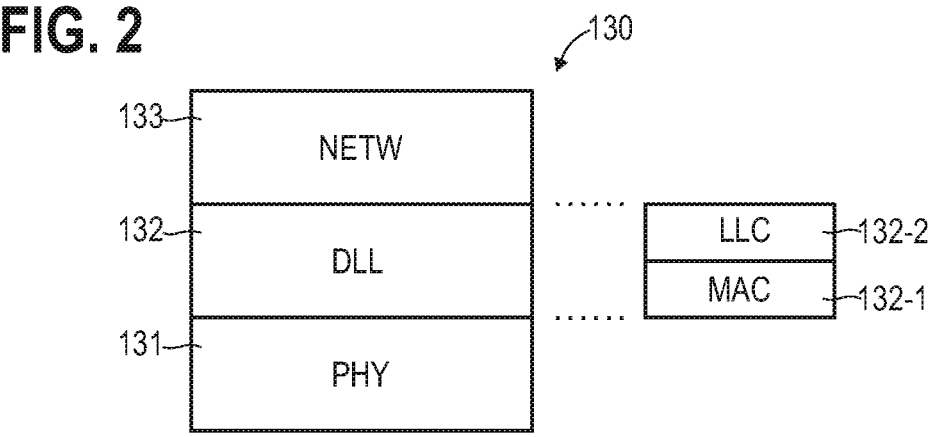
FIG. 2 schematically illustrates a part of a transmission protocol stack for communication on the radio channel.

FIG. 2 illustrates aspects with respect to the transmission protocol stack 130 employed for communicating on the radio channel 120-122. In FIG. 2, the three lowest layers 131-133 of the transmission protocol stack 130 are depicted. Layer 1 is the Physical layer (PHY) 131. Layer 2 is the Data Link Layer (DLL) 132. Layer 3 is the Network layer 133. Higher layers can include, e.g.: the transport layer; and the application layer (both not shown in FIG. 2).

In the example of FIG. 2—which corresponds to the IEEE 802.11x Wi-Fi protocol—the DLL 132 is subdivided into the Medium Access Control layer (MAC) 132-1 and the Logical Link Control layer (LLC) 132-2. The MAC 132-1 is responsible for implementing a HARQ protocol.

The MAC 132-1 typically has two native data structures, namely the MAC Service Data Unit (MSDU) at an upper edge thereof and the MAC Protocol Data Unit (MPDU) at a lower edge thereof. The MAC 132-1 can further implement aggregation functionality. Aggregation functionality can be implemented, e.g., with respect to the MSDU and/or with respect to the MPDU. Aggregating can result in derived native data structures such as the aggregated MSDU (A-MSDU) and/or the aggregated MPDU (A-MPDU). Here, and A-MSDU comprises a plurality of MSDUs. An A-MPDU comprises a plurality of MPDUs. In some examples, the plurality of MPDUs are aggregated into a sequence of subframes of the A-MPDU. Each subframe comprises a respective MPDU. Each subframe further comprises a subframe delimiter indicative of the beginning of the respective MPDU. The subframe delimiter can facilitate deaggregation of the aggregated MPDU. The subframe delimiter can be a single bit or multibit code that is predefined and thus can be identified by the receiver. See: IEEE 802.11n-2009; chapter 7.4a for the Wi-Fi A-MPDU.

Figure 3:
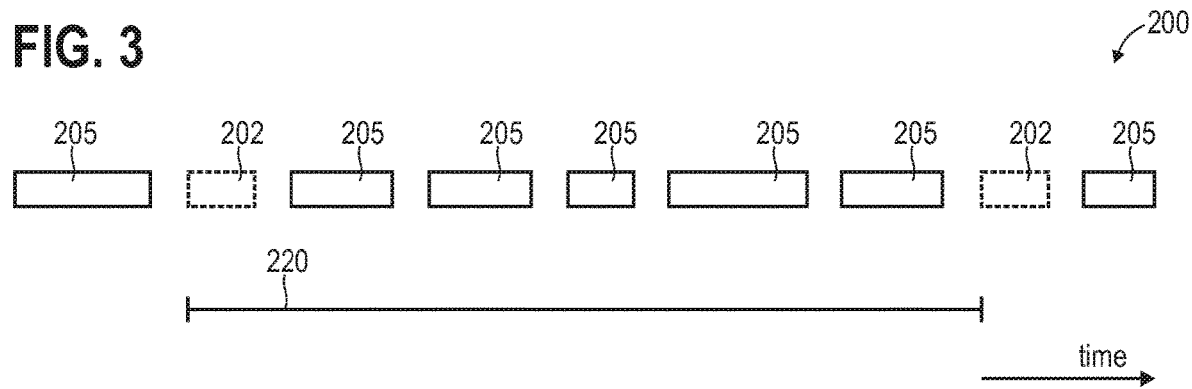
FIG. 3 schematically illustrates a sequence of protocol packets and probing packets communicated on the radio channel, the probing packets facilitating channel sensing and/or link adaptation.

FIG. 3 illustrates aspects with respect to a sequence 200 of protocol packets 205 which is intermitted from time to time by probing packets 202. The protocol packets 205 and the probing packets 202 are data structures associated with the transmission protocol stack 130. They may be associated with the same layer of the transmission protocol stack, e.g., may both be native to Layer 2 of the transmission protocol stack 130.

Both, the protocol packets 205 and the probing packets 202, respectively include a header section and a payload section (not shown in FIG. 3). The payload section can carry data originating from a position higher in the transmission protocol stack 130; while the header section can include data which is natively associated with the respective packet 202, 205. E.g., the header section can carry elements selected from the group comprising: a length indicator; a checksum; a sequence number; etc. The header section can comprise a native checksum, i.e., a checksum which is generated based on the payload section of the respective packet 202, 205.

Both, the protocol packets 205 and the probing packets 202 may carry certain data. The protocol packets 205 and/or the probing packets 202 may employ aggregation, i.e., may comprise a plurality of data packets. Here, the data packets, in turn, may again comprise a native checksum.

The probing packets 202 may be distinguishably characterized if compared to the protocol packets 205 of the sequence 200 with respect to one or more figures of merit. Examples are given hereinafter; these examples may be combined with respect to each other.

In a first examples, the probing packets 202 may employ essentially the same data structure—e.g., the A-MPDU data structure—as the protocol packets 205. Thus, both, the protocol packets 205, as well as the probing packets 202 correspond to IEEE 802.11x Wi-Fi protocol A-MPDUs. In such a scenario, the A-MPDUs 202, 205 comprise aggregated MPDUS as data packets (not shown in FIG. 3). In other examples, the probing packets 202 may use and at least partly different data structure which may be more suited or specifically tailored for facilitating channel sensing and/or link adaptation.

In a second example, the probing packets 202 may employ a symbol modulation which is different from a set symbol modulation used for transmitting the protocol packets 205 adjacent to the probing packet 202 in the sequence 200. E.g., a more conservative or more challenging symbol modulation—sometimes also referred to as constellation—may be selected. The symbol modulation may correspond to the number of bits encoded into a single symbol (bit loading). Here, a larger number of bits encoded into a single symbol may generally require a better channel condition in order to avoid excessive BER. Example symbol modulation may include Quadrature Phase Shift Keying (QPSK), Orthogonal Frequency Division Multiplexing (OFDM), Binary Phase Shift Keying (BPSK), Quadrature Amplitude Modulation (QAM), etc.

In a third example, the probing packets 202 may employ a symbol coding which is different from the set symbol coding used for transmitting the protocol packets 205 adjacent to the probing packet 202 in the sequence 200. E.g., a more conservative or more challenging symbol coding may be selected. The symbol coding may correspond to a number of redundancy bits associated with a checksum which facilitates forward error correction. The symbol coding may, alternatively or additionally, correspond to interleaving schemes. Examples of symbol coding include Complementary Coded Keying (CCK), BPSK, and QPSK, etc.

In a fourth example, the probing packets 202 may employ a transmission power which is different from the set transmission power used for transmitting the protocol packets 205 adjacent to the probing packet 202 in the sequence 200. The transmission power may define the amplitude of a signal present at an antenna of the respective interface 106, 116. E.g., a higher or lower transmission power may be selected.

Generally, a higher transmission power may reduce the BER; at the same time, interference into further radio channels can be increased.

In a fifth example, the probing packets 202 may employ a specific probing timing 220. As can be seen from FIG. 3, the sequence of protocol packets 205 is intermitted from time to time by probing packets 202. The probing packets are used for performing channel sensing and/or link adaptation. In detail, the probing packets 202 are transmitted on the radio channel 120-122 according to a probing timing 220. The probing timing 220 specifies repeated transmission occurrences of the probing packets 202. E.g., the probing timing 220 can specify a frequency of occurrence such as a periodicity of the transmission occurrences of the probing packets 202. In some examples, more frequent (less frequent) transmission occurrences of the probing packets 202 enable more accurate (less accurate) channel sensing and/or link adaptation on the one hand side; and, on the other hand side, can result in increased overhead and/or reduce transmission reliability.

In a sixth example, the probing packets 202 may carry payload data or probing control data. In detail, the protocol packets 205 typically include data packets which, in turn, include application-layer user data in their respective payload sections. E.g., with the protocol packets 205 corresponding to A-MPDUs, the respective payload sections can comprise one or more MPDUs and MSDUs which in turn can comprise higher-layer data such as data from the application layer, network layer, etc. In some examples, it is also possible that the aggregated data packets 201 of the probing packets 202 comprise application-layer user data in the respective payload sections in the same manner as explained above with respect to the protocol packets 205. In such a scenario, increased overhead due to communicating the probing packets 202 can be avoided. In other examples, it is also possible that the aggregated data packets 201 of the probing packets 202 do not include application-layer user data. E.g., it is possible that the data packets 201 of the probing packets 202 include probing control data. E.g., the probing control data can be generated in the DLL 132, e.g., in the MAC 132-1. The probing control data may be of limited relevance to higher layer such as a network layer 133 of the application layer and may thus, at the receiver, not be passed up to higher layers above the DLL 132. The probing control data can correspond to the sequence of bits which facilitates accurate channel sensing and/or link adaptation. Here, forward error correction constraints, interleaving constraints, etc. can be taken into account.

As can be seen from the above, generally, a transmission property used for transmitting the probing packet 202 can differ from the respective set transmission property used for transmitting the protocol packets 205 adjacent to the probing packet 202 in the sequence 200. Example transmission properties include the above-identified transmission power, symbol modulation, symbol coding, probing control data, probing timing 220, etc. In some examples, one or more transmission properties of the probing packet 202 may be flexible set. E.g., it is possible that the transmission property used for transmitting the probing packet 202 is determined based on the respective set transmission property used for transmitting protocol packets 205 adjacent to the probing packet 202 in the sequence 200. E.g., the set transmission property can serve as a baseline for the respective transmission property of the probing packet 220. A deviation or difference of the transmission property used for transmitting the probing packet 202 if compared to the baseline can thus be tailored. Thereby, it is possible to accurately modify the transmission property if compared to the respective set transmission property when transmitting the probing packet 202; this facilitates accurate channel sensing and/or link adaptation.

Figure 4:
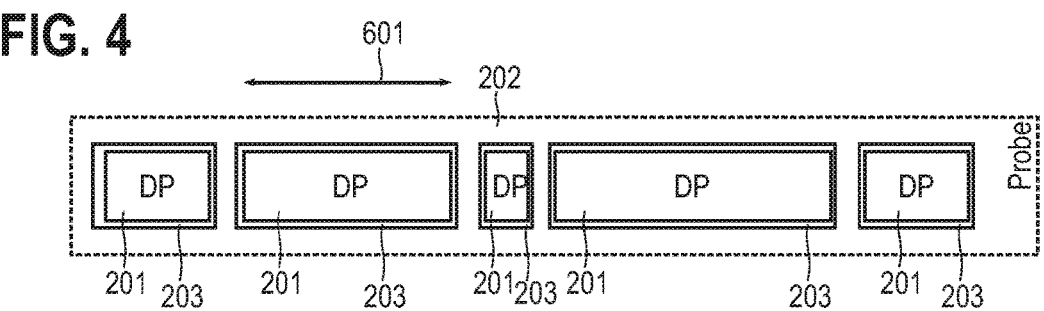
FIG. 4 schematically illustrates a probing packet according to various embodiments, the probing packet comprising a plurality of data packets, the data packets having different lengths.

FIG. 4 illustrates aspects with respect to the probing packet 202. In particular, from FIG. 4 it is apparent that the probing packet 202 comprises a plurality of data packets 201. Both, the proving packet 202 and the aggregated data packets 201 can be native to the same layer of the transmission protocol stack 130, e.g., the DLL 132 or the MAC 132-1. Again, each data packet 201 can comprise a header section and a payload section (not shown in FIG. 4). E.g., in the IEEE 802.11x Wi-Fi protocol, the data packets 201 can correspond to MPDUs or MSDUs.

From FIG. 4 it is further apparent that each data packet 201 is encapsulated by a subframe 203. The subframe comprises the subframe delimiter indicative of the beginning of the respective data packet 201 (not shown in FIG. 4). Such an arrangement of the probing packet 202 comprising the plurality of data packets 201 is sometimes referred to as aggregation.

In FIG. 4, exemplarily, the length 601 of one of the data packets 201 is illustrated. As can be seen from FIG. 4, the aggregated data packets 201 of the depicted probing packet 202 have different lengths 601. A likelihood of encountering a bit error—assuming stable channel conditions during the transmission of the entire probing packet 202—is larger for the longer data packets 201 than for the smaller data packets 201. Because the bit error can be tested for different lengths 601, a more comprehensive picture on the channel performance can be obtained when performing channel sensing and/or link adaptation.

In the example of FIG. 4, the probing packet 202 comprises five data packets 201. However, in other examples, the probing packet 202 may comprise a larger or smaller number/count of data packets 201. E.g., it is possible that a count of at least ten data packets 201 is aggregated into the sequence of subframes 203 of the probing packet 202, preferably a count of at least 50 data packets 201, more preferably a count of at least 150 data packets 201. A larger count of data packets 201 aggregated into the probing packet 202 facilitates more accurate channel sensing and/or link adaptation.

In some examples, it is possible to flexibly vary the count of data packets 201 aggregated into the probing packet 202. E.g., in some examples, it is possible to determine the count of the data packets 201 to be aggregated into the probing packet 202 based on at least one of the following: a previously determined BER associated with communicating on the radio channel 120-122; a traffic load of the radio channel 120-122; and a set transmission property used for transmitting protocol packets 205 adjacent to the probing packet 202 in the sequence 200. E.g., with a traffic load of the radio channel 120-122 is high, it can be desirable to limit the overall length of the probing packet 202; hence, to limit the count of the aggregated data packets 201. E.g., for different set transmission properties used as a baseline for transmitting the protocol packets 205, different schemes for aggregating the data packets 201 into the probing packet 202 can be used. Thereby, the aggregation scheme can be tailored to the particular channel condition. This also applies with respect to using the BER for determining the count of the aggregated data packets 201.

Similar consideration is presented above with respect to flexibly determining the count of the aggregated data packets 201 also apply to flexibly adjusting a length distribution of the aggregated data packets 201.

Figure 5:
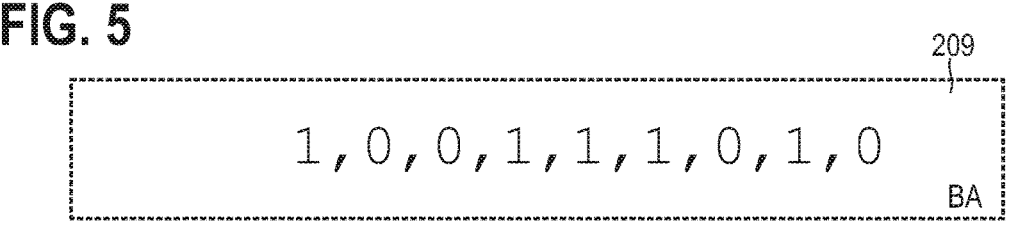
FIG. 5 schematically illustrates an acknowledgment message positively and negatively acknowledging the aggregated data packets of the probing packet.

FIG. 5 illustrates aspects with respect to an acknowledgment message 209. The acknowledgment message 209 is used in the context of the ARQ protocol. Thus, the acknowledgment message 209 is native to the MAC 132-1.

In the example of FIG. 5, the acknowledgment message 209 includes a plurality of indicator bits which positively or negatively acknowledge receipt of a corresponding plurality of previously communicated data packets 201. Thus, the acknowledgement message 209 is associated with the data packets 201.

The sequence of indicator bits is sometimes referred to as a bitmap. Because the acknowledgment message 209 in the example of FIG. 5 comprises a plurality of indicator bits, it is sometimes referred to as block acknowledgment message (BA) 209. In other examples, a separate acknowledgment message may be communicated for each previously communicated data packet 201. Then, block acknowledgment is not employed.

Further, in the example of FIG. 5, the acknowledgment message 209 includes positive acknowledgments (PACKs) and negative acknowledgments (NACKs). In other examples, it is possible to either only explicitly indicate successful receipt by means of PACKs (negative acknowledgment is then implicitly achieved)—or explicitly indicate failed receipt by means of NACKs (positive acknowledgement is the implicitly achieved).

The indicator bits of the acknowledgment message 209 according to the example of FIG. 5, in particular, indicates positive or negative receipt of each one of the data packets 201 included in the probing packet 202 according to the example of FIG. 4. Thus, based on the information included in the acknowledgment message 209, it is possible to conclude whether a specific one of the data packets 201 included in the probing packet 202 has been successfully received or whether receipt has failed. This can be used in order to perform accurate channel sensing and/or link adaptation, including the determining of the BER—corresponding to the different lengths 601 of the data packets 201.

While in the example of FIG. 5 the acknowledgment message 209 is indicative of successful or failed receipt of each one of the plurality of data packets 201, in other examples, it is possible that the acknowledgment message 209 is indicative of successful of failed receipt of only some of the plurality of first packets 201. Also in such a scenario, it may be possible to perform more accurate channel sensing and/or link adaptation to some degree.

Figure 6:
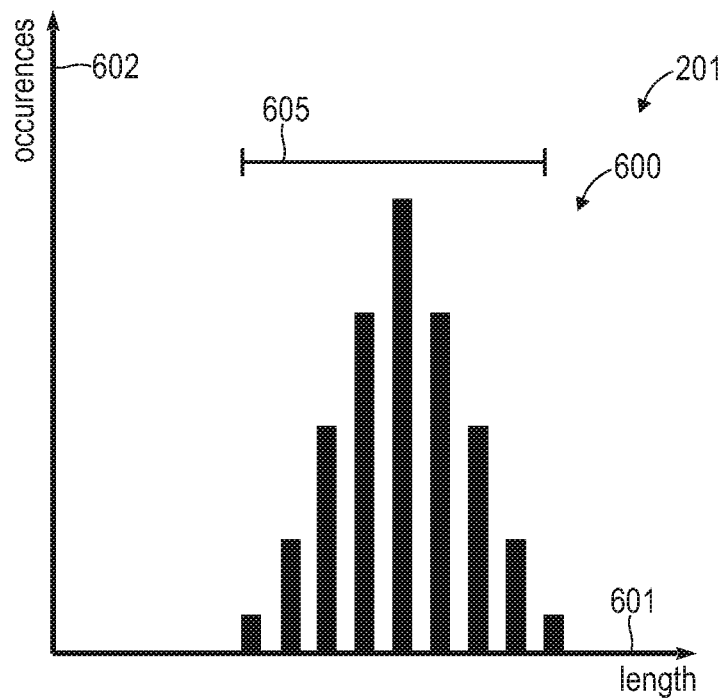
FIG. 6 schematically illustrates a length distribution of the aggregated data packets of the probing packet according to various embodiments.

FIG. 6 illustrates aspects with respect to the length distribution 600 of the aggregated data packets 201. FIG. 6 is a histogram illustrating the number of occurrences 602 of different lengths 601 of data packets 201 aggregated into a given probing packet 202. As can be seen in the example of FIG. 6 the length distribution 600 comprises a maximum. However, in other examples, it is not required that a strong dependency of the number of occurrences 602 on the length 601 is implemented as shown in the example of FIG. 6. E.g., in the scenario of FIG. 7—which also illustrates aspects with respect to the length distribution 600 of the aggregated data packets 201 in the form of a histogram—a less pronounced dependency of the number of occurrences 602 on the length 601 is also conceivable.

Figure 7:
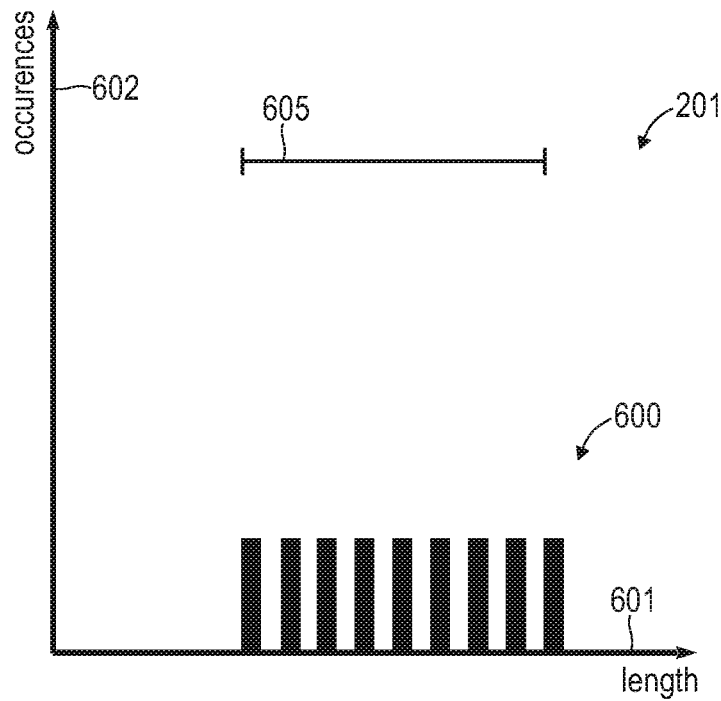
FIG. 7 schematically illustrates a length distribution of the aggregated data packets of the probing packet according to various embodiments.

Illustrated in, both, FIGS. 6 and 7 is a difference 605 between the shortest one of the plurality of aggregated data packets 201 (illustrated to the left in FIGS. 6 and 7) and the longest one of the plurality of aggregated data packets 201 (illustrated to the right in FIGS. 6 and 7). This difference 605 can vary for different example implementations. E.g., it is possible that the length 601 of the shortest one of the plurality of aggregated data packets 201 is smaller by a factor of 2 if compared to the length 601 of the longest one of the plurality of aggregated data packets 201, preferably by a factor of 10, more preferably by a factor of 100. Generally, a larger variation of the length 601 can be desirable in order to facilitate more accurate channel sensing and/or link adaptation.

While—on the one hand side—the count of the aggregated data packets 201 can vary in different implementations, it is also possible that the link distribution 600 comprises a different number of lengths 601 in different examples. E.g., the length distribution 600 may comprise 10 different lengths, preferably at least 50 different lengths, more preferably at least 150 different lengths 601.

Even if the data packets 201 have different lengths, it is possible that the native checksums of the data packets 201 are all of the same size.

Figure 8:
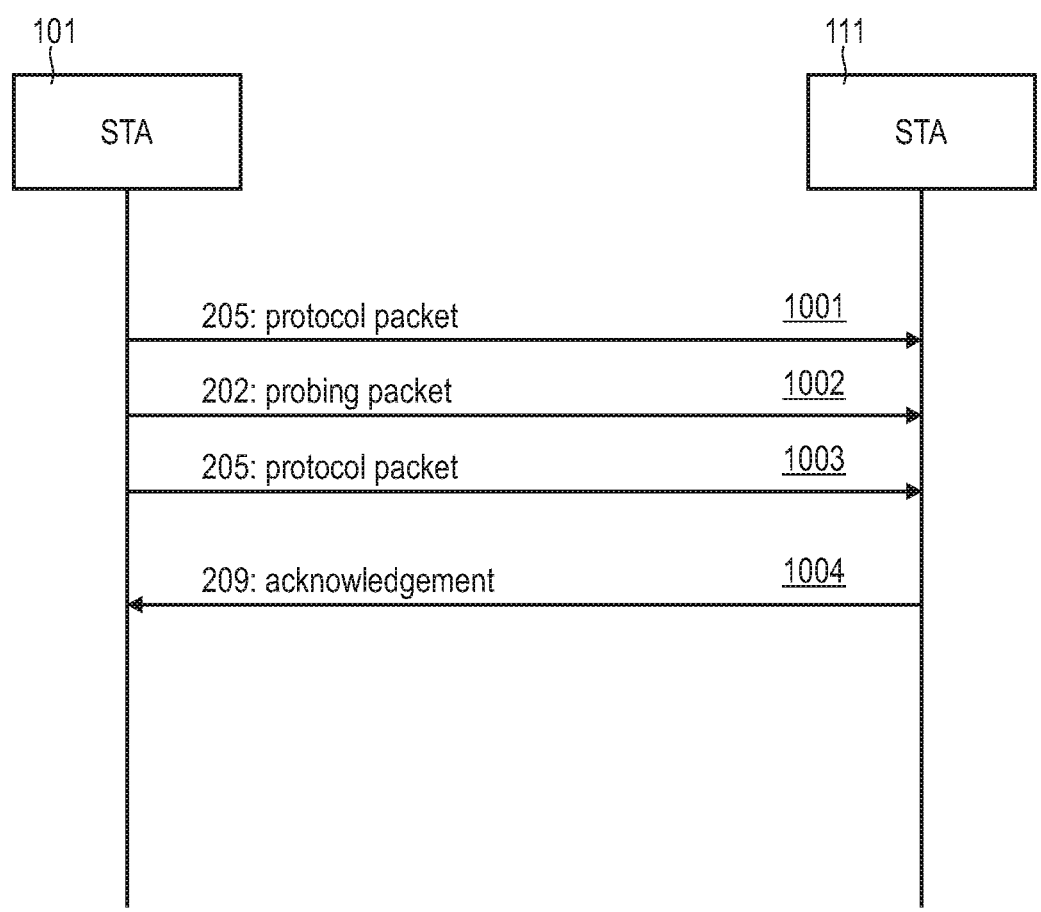
FIG. 8 is a signaling diagram illustrating communication of protocol packets, probing packets and acknowledgment messages according to various embodiments.

FIG. 8 is a signaling diagram illustrating communication between the communication devices 101 and 111 on the radio channel 120-122. First, at 1001, the communication device 101 transmits a protocol packet 205. The protocol packet 205 comprises, in some examples, a plurality of aggregated data packets 201; each aggregated data packet 201 carries a sequence number. Based on the sequence number of the aggregated data packets 201, an ARQ protocol is implemented. This informs the communication device 101 whether receipt of the plurality of aggregated data packets 201 was successful or failed.

At 1002, the communication device 101 transmits a probing packet 202. Again, the probing packet 202 comprises a plurality of aggregated data packets 201; each aggregated data packet 201 carries a respective sequence number in the sequence number space of the aggregated data packets 201 of the protocol packet 205 transmitted at 1001. Based on the sequence number of the aggregated data packets 201, the ARQ protocol is implemented. This informs the communication device 101 whether receipt of the plurality of aggregated data packets 201 was successful or failed.

At 1003, a further protocol packet 205 is transmitted by the communication device 101.

Due to channel imperfections of the radio channel 120-122, the communication device 111 may experience bit error is when receiving the aggregated data packets 201 at 1001-1003. Sometimes, the bit errors may be so severe that FEC cannot correct the errors and, consequently, receipt of the respective aggregated data packet 201 fails (failed receipt). Such FEC can be implemented with respect to the protocol packets 205 communicated at 1001 and 1003 and the probing packet 202 communicated at 1002. For this, the protocol packets 205 and/or the probing packet 202 can comprise a native checksum. The native checksum can enable FEC for the payload sections of the respective packets 202, 205. Alternatively or additionally, such FEC can also be implemented with respect to the aggregated data packets 201 included in the protocol packets 205 and/or the probing packet 202. Also, the aggregated data packets 201 can comprise native checksums.

For failed receipt, in some examples, a retransmission attempt of the respective aggregated data packet 201 for which receipt has failed can be implemented. To implement such a retransmission attempt, the ARQ protocol comprises the communication device 111 transmitting an acknowledgment message 209 at 1004. This acknowledgment message 209 includes a block acknowledgment of all aggregated data packets 201 communicated during 1001-1003.

Based on the information on successful or failed receipt of the aggregated data packets 201 included in the probing packet 202 communicated at 1002, it is also possible to perform channel sensing and/or link adaptation. In particular, the BER can be estimated. Because the probing packet 202 communicated at 1002 includes a length distribution 600, i.e., includes data packets 201 having different lengths, channel sensing and/or link adaptation can be performed more accurately.

Figure 9:
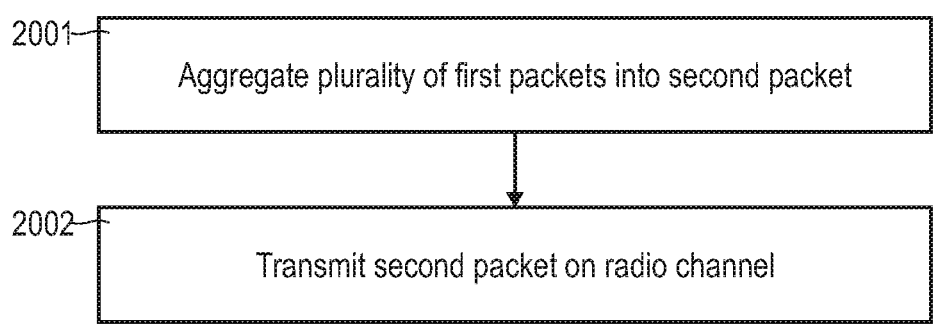
FIG. 9 is a flowchart of a method according to various embodiments.

FIG. 9 is a flowchart of a method according to various embodiments. E.g., the method according to FIG. 9 may be executed by the processor 105 of the communication device 101 and/or the processor 115 of the communication device 111. First, at 2001, a plurality of first packets—e.g., the data packets 201—are aggregated into a given second packet—e.g., the probing packet 202. Then, at 2002, the second packet is transmitted on the radio channel.

Figure 10:
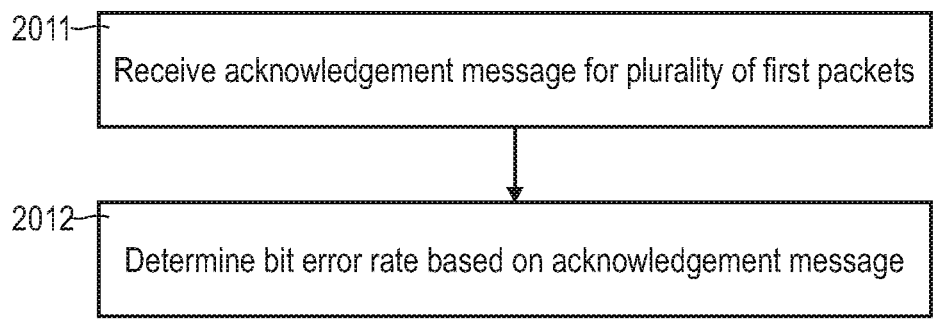
FIG. 10 is a flowchart of a method according to various embodiments.

FIG. 10 is a flowchart of a method according to various embodiments. E.g., the method according to FIG. 10 may be executed by the processor 105 of the communication device 101 and/or the processor 115 of the communication device 111. E.g., the method according to FIG. 10 may be executed subsequently to the method according to FIG. 9.

At 2011, an acknowledgment message is received for a plurality of first packets. In some examples, single acknowledgment messages may include a block acknowledgment for the plurality of first packets. E.g., the block acknowledgment may individually positively or negatively acknowledge each one of the plurality of first packets. In further examples, a plurality of acknowledgment messages is received; the information on the successful or failed receipt of the plurality of first packets is then distributed across the plurality of acknowledgment messages.

At 2012, a BER is determined based on the acknowledgment message is received in 2011. Furthermore, determining of the BER may take into account the length of the first packets aggregated into the second packet. The length of the first packets aggregated into the second packet may serve as a baseline for determining of the BER.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above various examples of aggregation have been explained in the context of probing packets, in other examples respective techniques may be readily applied to other kinds and types of packets such as protocol packets.

The invention claimed is:
1. A communication device, comprising:
an interface configured to transceive on a radio channel,
at least one processor configured to aggregate a plurality of first packets of at least partially different lengths into a second packet, wherein the second packet is a probing packet,
wherein the at least one processor is configured to transmit the second packet via the interface interposed between two protocol packets of a plurality of protocol packets, wherein the protocol packets comprise a transmission property that is different from a transmission property of a probing packet,
wherein the second packet has a transmission property associated therewith used by the at least one processor for transmitting the second packet that differs from a transmission property associated with the protocol packets,
wherein the at least one processor is configured to receive at least one acknowledgement message via the interface, the at least one acknowledgement message being indicative of successful or failed receipt of the plurality of first packets, and
wherein the at least one processor is configured to perform at least one of channel sensing and link adaptation of the radio channel based on the at least one acknowledgement message.

2. The communication device of claim 1,
wherein the at least one acknowledgement message is indicative of successful or failed receipt of each one of the plurality of first packets.

3. The communication device of claim 1,
wherein the at least one processor is configured to estimate a bit error rate associated with communicating on the radio channel based on the at least one acknowledgement message.

4. The communication device of claim 1,
wherein the least one processor configured to aggregate the plurality of first packets into a sequence of subframes of the second packet, each one of the subframes comprising a subframe delimiter indicative of the beginning of the respective first packet.

5. The communication device of claim 1,
wherein the second packet is a probing packet transmitted via the interface using a symbol modulation different from a set symbol modulation used for transmitting, via the interface, further packets adjacent to the second packet in a sequence of packets.

6. The communication device of claim 5,
wherein the at least one processor is configured to transmit the second packet via the interface according to a probing timing specifying repeated transmission occurrences of probing packets.

7. The communication device of claim 1,
wherein each one of the plurality of first packets comprises a header section and a payload section, the payload sections of the plurality of first packets comprising application-layer user data and/or probing control data.

8. The communication device of claim 1,
wherein each one of the plurality of first packets comprises a native checksum,
wherein the native checksums of the plurality of first packets are all of the same size.

9. The communication device of claim 1,
wherein the second packet comprises a native checksum.

10. The communication device of claim 1,
wherein the at least one processor is configured to determine at least one of a count of the plurality of first packets and a length distribution of the plurality of first packets to be aggregated into the second packet based on at least one of the following: a previously determined bit error rate associated with communicating on the radio channel; a traffic load of the radio channel; and a set transmission property used for transmitting, via the interface, further packets adjacent to the second packet in a sequence of packets.

11. The communication device of claim 1,
wherein the first packets and the second packet are native to Layer 2 of a transmission protocol stack associated with the radio channel.

12. The communication device of claim 1,
wherein the radio channel is implemented according to the IEEE 802.11x Wi-Fi protocol,
wherein the first packets are Medium Access Control Protocol Data Units, MPDUs,
wherein the second packet is an Aggregate Medium Access Control Protocol Data Unit, A-MPDU.

13. The communication device of claim 1,
wherein the communication device is a IEEE 802.11x Wi-Fi access point or station.

14. A communication device, comprising:
an interface configured to transceive on a radio channel,
at least one processor configured to aggregate a plurality of first packets of at least partially different lengths into a second packet,
wherein the at least one processor is configured to transmit the second packet via the interface,
wherein the at least one processor is configured to receive at least one acknowledgement message via the interface, the at least one acknowledgement message being indicative of successful or failed receipt of the plurality of first packets, and
wherein the at least one processor is configured to perform at least one of channel sensing and link adaptation of the radio channel based on the at least one acknowledgement message,
wherein the second packet is a probing packet transmitted via the interface using a transmission power different from a set transmission power used for transmitting, via the interface, further packets adjacent to the second packet in a sequence of packets.

15. A communication device, comprising:
an interface configured to transceive on a radio channel,
at least one processor configured to aggregate a plurality of first packets of at least partially different lengths into a second packet,
wherein the at least one processor is configured to transmit the second packet via the interface,
wherein the at least one processor is configured to receive at least one acknowledgement message via the interface, the at least one acknowledgement message being indicative of successful or failed receipt of the plurality of first packets,
wherein the at least one processor is configured to perform at least one of channel sensing and link adaptation of the radio channel based on the at least one acknowledgement message, and
wherein the length of the shortest one of the plurality of first packets is smaller by at least a factor of two if compared to the length of the longest one of the plurality of first packets, or
wherein the at least one processor is configured to aggregate a count of at least 10 first packets into the second packet, or
wherein a length distribution of the plurality of first packets comprises at least 10 different lengths.

* * * * *